United States Patent
Swift et al.

(10) Patent No.: US 10,393,068 B2
(45) Date of Patent: Aug. 27, 2019

(54) SHAFTING ARRANGEMENT FOR A GAS TURBINE ENGINE

(71) Applicant: ROLLS-ROYCE plc, London (GB)

(72) Inventors: Andrew Swift, Uttoxeter (GB); Stewart T Thornton, Derby (GB); Paul Simms, Leicester (GB); Glenn A Knight, Belper (GB)

(73) Assignee: ROLLS-ROYCE plc, London (GB)

( * ) Notice: Subject to any disclaimer, the term of this patent is extended or adjusted under 35 U.S.C. 154(b) by 421 days.

(21) Appl. No.: 15/262,612

(22) Filed: Sep. 12, 2016

(65) Prior Publication Data
US 2017/0082065 A1   Mar. 23, 2017

(30) Foreign Application Priority Data

Sep. 18, 2015 (GB) .................................. 1516570

(51) Int. Cl.
*F02K 3/06* (2006.01)
*F01D 25/16* (2006.01)
(Continued)

(52) U.S. Cl.
CPC ............... *F02K 3/06* (2013.01); *F01D 25/16* (2013.01); *F01D 25/162* (2013.01); *F02C 3/107* (2013.01);
(Continued)

(58) Field of Classification Search
CPC .......... F02K 3/06; F01D 25/16; F01D 25/162; F01D 2220/326; F01D 2220/327;
(Continued)

(56) References Cited

U.S. PATENT DOCUMENTS 4,916,894 A * 4/1990 Adamson ................ F02C 3/107
                                                  416/171
4,969,325 A * 11/1990 Adamson ................ F02C 3/067
                                                  416/129
(Continued)

FOREIGN PATENT DOCUMENTS

EP    1649191 A1    4/2006
EP    1777380 A2    4/2007
(Continued)

OTHER PUBLICATIONS

Feb. 26, 2016 Search Report issued in British Patent Application No. 1516571.5.
(Continued)

*Primary Examiner* — Carlos A Rivera
(74) *Attorney, Agent, or Firm* — Oliff PLC (57) ABSTRACT

A gas turbine engine, including: a low pressure spool having a low pressure compressor and a low pressure turbine connected by a low pressure shaft; a reduction gear train having a sun gear, a carrier having a plurality of planet gears attached thereto, and a ring gear, wherein one of the sun gear, carrier or ring gear is connected to the low pressure shaft, and another of the sun gear, carrier and ring gear provides an output drive; a propulsive fan mounted fore of the gear train; a fan shafting arrangement comprising a fan shaft which is connected to the output drive of the gear train and a fan support shaft which passes through center of the gear train along the axis of rotation of the gearbox and fan, wherein the fan shafting arrangement is rotatably supported by at least two axially separated bearings.

16 Claims, 4 Drawing Sheets

(51) Int. Cl.
  *F02C 3/107* (2006.01)
  *F02C 7/06* (2006.01)
  *F02C 7/36* (2006.01)

(52) U.S. Cl.
  CPC .............. *F02C 7/06* (2013.01); *F02C 7/36* (2013.01); *F05D 2220/32* (2013.01); *F05D 2220/326* (2013.01); *F05D 2220/327* (2013.01); *F05D 2250/311* (2013.01); *F05D 2260/40311* (2013.01); *F05D 2260/941* (2013.01); *F05D 2260/96* (2013.01)

(58) Field of Classification Search
  CPC .. F01D 2260/40311; F02C 3/107; F02C 7/36; F05D 2220/326; F05D 2220/327; F05D 2260/40311
  See application file for complete search history.

(56) References Cited

U.S. PATENT DOCUMENTS

| | | | |
|---|---|---|---|
| 6,622,473 | B2 | 9/2003 | Becquerelle et al. |
| 7,493,754 | B2* | 2/2009 | Moniz ............ F02C 7/36 415/9 |
| 8,667,777 | B2* | 3/2014 | Gallet ............ F01D 1/24 60/226.1 |
| 2007/0084183 | A1* | 4/2007 | Moniz ............ F01D 21/04 60/204 |
| 2007/0084185 | A1* | 4/2007 | Moniz ............ F01D 25/16 60/204 |
| 2007/0084187 | A1* | 4/2007 | Moniz ............ F02C 3/067 60/204 |
| 2007/0084189 | A1* | 4/2007 | Moniz ............ F02K 3/072 60/204 |
| 2007/0084190 | A1* | 4/2007 | Moniz ............ F02C 7/36 60/204 |
| 2007/0240399 | A1* | 10/2007 | Orlando .......... F02C 7/36 60/39.162 |
| 2012/0099988 | A1 | 4/2012 | Charier et al. |
| 2014/0227084 | A1 | 8/2014 | Sheridan |
| 2017/0081973 | A1* | 3/2017 | Swift ............ F01D 5/02 |

FOREIGN PATENT DOCUMENTS

| | | |
|---|---|---|
| EP | 2360391 A1 | 8/2011 |
| EP | 2518279 A2 | 10/2012 |
| GB | 878934 A | 10/1961 |
| GB | 1484948 A | 9/1977 |
| WO | 2005/012761 A1 | 2/2005 |

OTHER PUBLICATIONS

Feb. 26, 2016 Search Report issued in British Patent Application No. 1516570.7.

Jan. 31, 2017 Search Report issued in British Patent Application No. 16188333.

* cited by examiner

SHAFTING ARRANGEMENT FOR A GAS TURBINE ENGINE

TECHNICAL FIELD OF INVENTION

This invention relates to a bearing and shafting arrangement for a gas turbine engine. In particular, the invention relates to a shafting arrangement in a geared turbofan in which a reduction gearbox is used to provide a drive of the propulsive fan.

BACKGROUND OF INVENTION

Figure 1:
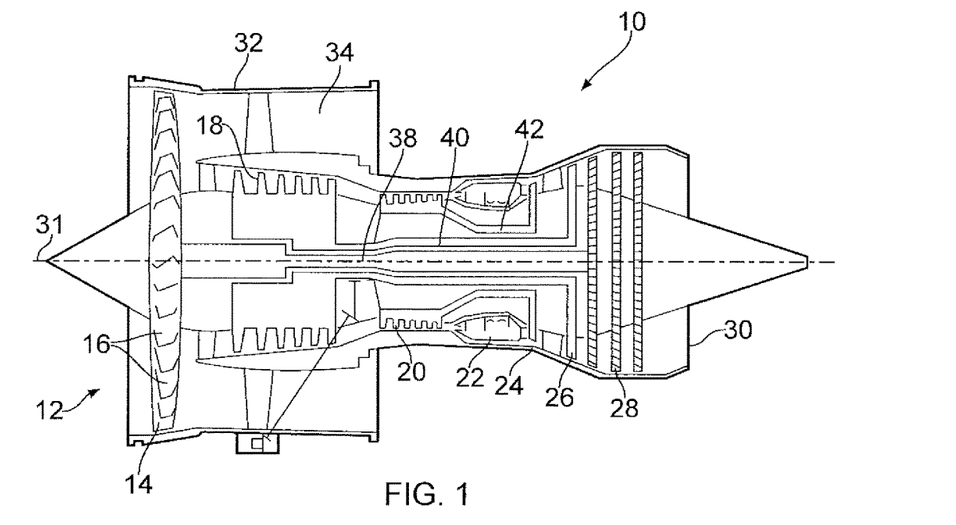
FIG. 1 shows convention gas turbine engine as described above in the background section.

FIG. 1 shows a ducted fan gas turbine engine 10 comprising in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle (not shown) generally surrounds the fan casing 32 and engine 10 and defines the intake 12, a bypass duct 34 and a bypass exhaust nozzle. The engine has a principal axis of rotation 31.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by concentric interconnecting shafts 38, 40, 42.

The functional requirements of the fan structure and transmission systems of the fan include amongst others: reacting the fan thrust, radial and couple loads; transmitting the power from the turbine to the fan; and transferring structural loads to the engine casing, nacelle and ultimately airframe.

The loads from the fan rotor are transmitted to the engine structure by the use of bearings. The bearings and general shafting arrangement are a key component to address the reaction of loads and transmitting of power to the fan from the turbine.

Typically, the LP system of a direct drive turbofan such as that shown in FIG. 1 consists of fan and turbine rotors connected by a shaft which is supported in the engine structure by a combined bearing support system. The bearing support system usually comprises two or three bearings for the whole LP system. The bearings are typically positioned towards the ends of the respective shaft and optionally at a mid-portion depending on the specific requirements of the engine.

Current trends in gas turbine engines are moving towards so-called geared turbofan engines in which the fan is driven through a reduction gear train. The gear train allows the low pressure spool to be driven at higher rotational speeds which provides for a more efficient lighter engine core, whilst reducing the speed of the fan allows it to be a larger diameter thereby providing a higher bypass ratio. The reduction gear trains may be epicyclic in which the fan is driven via the carrier of a planetary configuration or a star configuration in which the planet gears are fixed, the fan shaft being driven by the ring or star gear. The gear train may be a compound configuration as known in the art.

EP1777380 describes a counter rotating fan assembly coupled to the low pressure turbine. The fan assembly includes a first fan assembly which is directly connected to and driven by the low pressure turbine, and a second fan assembly. The second fan assembly is driven through a gearbox to provide the counter rotation. The second fan is also driveably connected to the low pressure compressor or so-called booster compressor.

The introduction of the reduction gearing leads to a more complex bearing support system in which the low pressure spool, gear train and fan all require bearing support.

The present invention seeks to provide an improved shafting arrangement which allows for improved bearing support.

STATEMENTS OF INVENTION

The present invention provides a gas turbine engine according to the appended claims.

A gas turbine engine may comprise: a low pressure spool having a low pressure compressor and a low pressure turbine connected by a low pressure shaft; a reduction gear train having a sun gear, a carrier having a plurality of planet gears attached thereto, and a ring gear, wherein one of the sun gear, carrier or ring gear is connected to the low pressure shaft, and another of the sun gear, carrier and ring gear provides an output drive; a propulsive fan mounted fore of the gear train; a fan shafting arrangement comprising a fan shaft which is connected to the output drive of the gearbox and a fan support shaft which passes through centre of the gearbox along the axis of rotation of the gearbox and fan, wherein the fan shafting arrangement is rotatably supported by at least two axially separated bearings.

The reduction gear train may be an epicyclic gear box in which the output drive is the carrier, and the input drive is the sun gear.

The reduction gear ratio of the gear train may be between 2.5:1 and 5:1.

The fan support shaft may be coaxially nested within the low pressure shaft aft of the gear train.

The two axially separated bearings may include a fore bearing located forward of the gear train and an aft bearing located aft of the gear train.

The fan shafting arrangement may further include a drive arm which connects the fan shaft to the carrier and the fore bearing is forward of the drive arm.

The drive arm may include a fore drive arm and an aft drive arm which are located respectively forward and aft of the gear train, wherein the fore and aft drive arms connect to respective sides of the carrier.

The gearbox may be enclosed within a housing having upstream and downstream walls, each of the upstream and downstream walls including bearings which engage with and provide rotational support for the fore and aft drive arms respectively.

The aft bearing may be an intershaft bearing located between the fan support shaft and low pressure shaft.

The aft bearing may a thrust bearing. The front bearing may be a roller bearing.

The drive arm may include a coupling portion which includes a section of the shaft wall having a divergent-convergent diametric profile in the downstream direction.

The support shaft may be formed in part by a portion of the low pressure shaft which passes through the sun gear.

The support shaft may extend beyond the low pressure shaft in the downstream direction.

The low pressure shaft and fan shaft may be separated by an intershaft bearing arrangement which is located upstream of the gearbox.

Within the scope of this application it is expressly envisaged that the various aspects, embodiments, examples and alternatives, and in particular the individual features thereof, set out in the preceding paragraphs, in the claims and/or in the following description and drawings, may be taken independently or in any combination where technically compatible, unless otherwise stated.

DESCRIPTION OF DRAWINGS

Embodiments of the invention will now be described with the aid of the following drawings of which.

DETAILED DESCRIPTION OF INVENTION

Figure 2:
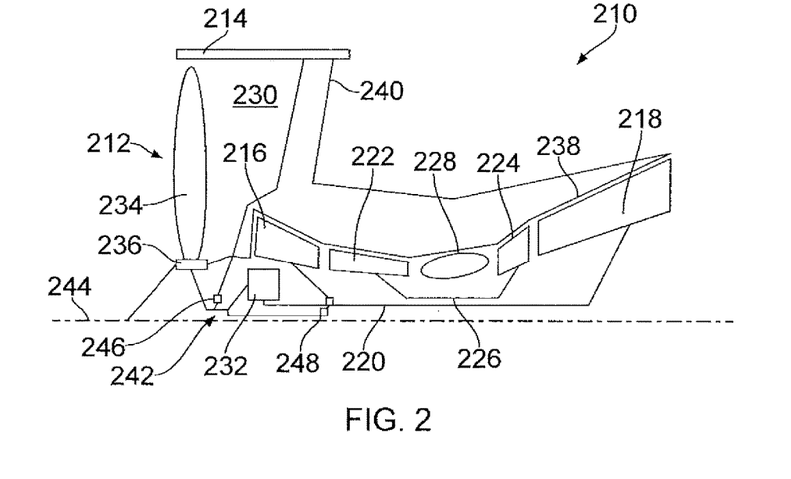
FIG. 2 shows a schematic section of a geared turbo fan arrangement.

FIG. 2 shows a geared gas turbine engine 210 having low and high pressure spools, each having respective compressors and turbines driveably interconnected by respective shafts. Thus, there is a low pressure compressor 216 connected to the low pressure turbine 218 via a low pressure shaft 220, and a high pressure compressor 222 connected to a high pressure turbine 224 via a high pressure shaft 226. The low 216 and high 222 pressure compressors progressively compress air from an inlet downstream of a fan 212 to an outlet in flow proximity to the combustor 228. Compressed air flows from the high pressure compressor 222 to the combustor 228 in which fuel is added to the air and the mixture burnt. The combusted air then expands through the high 224 and low 218 pressure turbines in flow series. The low 220 and high 226 pressure shafts interconnecting the respective turbines and compressors provide the drive for the compressors.

The fan 212 is foremost so as to be located at the front of the engine 210 and receive air direct from the engine intake, providing it for the inlet of the compressors and the main propulsive flow down the bypass duct 230. The fan 212 is driveably connected to the low pressure shaft 220 via a gear train 232 in the form of an epicyclic reduction gear box. The gear train 232 is located between the low pressure shaft 220 and the fan 212 and is arranged to reduce the speed of the fan 212 relative to the speed of the low pressure turbine 224. Such an arrangement allows for a higher speed and more efficient low pressure turbine 218, and slow spinning larger fan which can provide a higher bypass ratio. This freedom allows the speed of the fan and low pressure turbine to be independently optimised.

The fan 212 has a plurality fan blades 234 extending radially from a hub 236 which is mounted so as to rotate about the principle axis of the engine 210. The fan 212 resides within a fan casing 214 which partially defines the bypass duct 230. An engine casing 238 surrounds the engine core which comprises the low and high pressure spools and combustor 228. The engine casing generally provides containment and structural support for the engine core. The engine casing 238 is ultimately attached to and supported by the wing of the aircraft via an appropriate arrangement of struts 240 which extend across the bypass duct 230 and the nacelle which attaches to a pylon as is well known in the art.

The gear train 232 is in the form of an epicyclic reduction gearbox which is driven in a planetary configuration. The gear train 232 includes a ring or annular gear which is held substantially stationary in relation to the engine, a planet gear set with individual planets gears interconnected via a carrier, and a sun gear. The sun gear is rotatably connected to the low pressure shaft. The fan is connected to the output shaft of the gearbox which is in the form of the carrier of the planet gear via a fan shafting arrangement 242.

The fan shafting arrangement 242 is rotatable about and in some part defines the principal axis 244 of the geared gas turbine engine 210 and is supported by two axially separated bearings. Thus there is a front bearing 246 provided forward of the gear train 232 with respect to the flow direction of the engine, and a second bearing 248 positioned aft of the gearbox 232.

As will be seen from the following FIGS. 3 to 7, the fan shafting arrangement 242 typically comprises a fan shaft 312 which is independently rotatable from the low pressure shaft 358 by virtue of an intershaft bearing or by being coupled directly to the engine casing via a direct support which does not include the low pressure shaft. In some embodiments, the shafting arrangement may include a portion of the low pressure shaft as per FIG. 5 which is described below. A notable feature of the shafting arrangement is that it has a support shaft which passes through the sun gear of the reduction gear.

Figure 3:
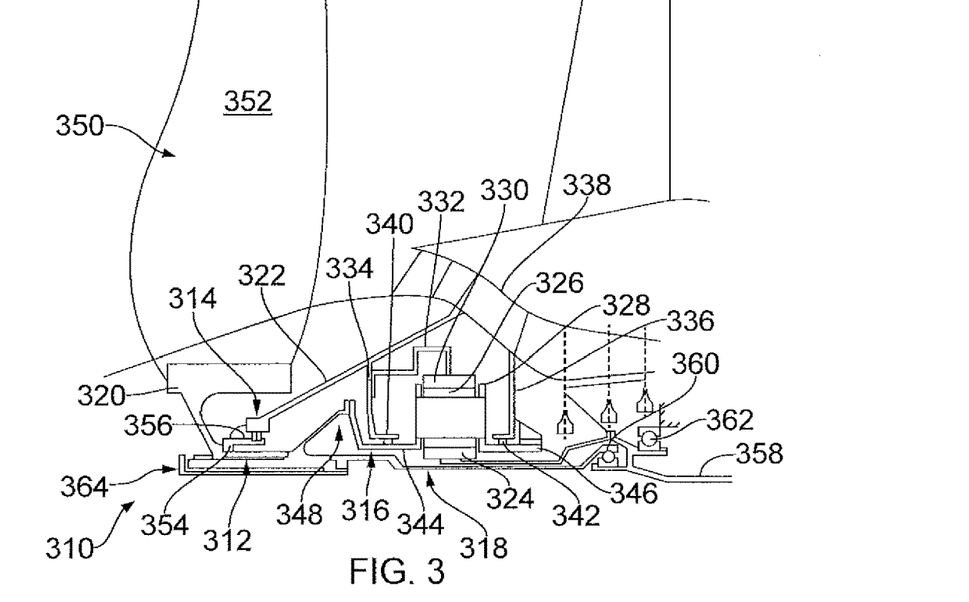
FIG. 3 shows a partial section of a geared turbo fan shafting arrangement.

FIG. 3 shows a first fan shafting arrangement 310 in more detail. The shafting arrangement 310 includes: a fan shaft 312; a hub portion 320; a front bearing portion 314 which carries the front bearing 356 so as to radially support the fan shaft 312 via a support structure 322; a drive arm 316 which is attached to the carrier of the gear box and provides the drive for the fan, and a support shaft 318 which extends through the sun gear.

The gear train is an epicyclic reduction gearbox having a sun gear 324, planet gears 326 which are connected by a carrier 328, and a ring gear 330 which is secured to the engine structure via a ring gear support arm 332. The gearbox is held within a housing defined by fore 334 and aft 336 walls which extend radially from the engine casing 338 and terminate in bearings 340, 342 which engage with respective fore 344 and aft 346 portions of the drive arm 316.

The drive arm 316 extends along and is coaxial with the principal axis of the engine and is generally axi-symmetric. The drive arm 316 includes a coupling 348 and a carrier shaft which comprises a fore drive arm 344, the carrier 328 and an aft drive arm 346. It will be appreciated that the so-called aft drive arm does not carry any driving torque and is thus functionally a support shaft rather than a drive shaft per se.

The coupling 348 extends from a first end, which is attached to the main body of the fan shaft, to the fore drive arm 344. The attachment of the coupling to the fan shaft is dependent on many factors but will generally be placed at the point which minimises the radial deflections of the fan shaft which are transmitted to the gearbox. The coupling 348 helps isolate the gearbox from vibration and bending moments experienced by the fan when in use. Thus, the coupling is torsionally rigid but relatively flexible in the radial direction.

The fore 344 and aft 346 drive arms provide a single rotating structure with the carrier 328 to provide the carrier shaft. The carrier shaft is held in rotative alignment with the principle axis of the engine via the gearbox housing bearings 340, 342. It will be appreciated that other configurations of bearings may be used. For example, the bearings need not be attached to the housing of the gear box structure.

The fan 350 is mounted to the hub portion of the shafting arrangement. The hub portion 320 includes a radially outer body shaped to receive the root end of the fan blades 352 in a conventional manner. The hub portion 320 is mounted to the fan shaft 312 so as to be rotatably locked and so co-driven therewith about the principal axis of the engine.

The front bearing portion 354 is in the form of a small stub shaft which is concentrically nested around a shaft of the hub portion 320 and the fan shaft 312 and provides the inner bearing race. The front bearing portion 354 provides a platform for receiving the inner race of the front bearing. The platform is in the form of a cylindrical wall which is spaced from and radially outside of the outer surface of the fan shaft 312.

The inner race of the front bearing 356 is mounted to the outer surface of the front bearing stub shaft towards a distal end thereof. The radially outer race of the front bearing 356 is supported by a frustoconcical support wall 322 which extends radially outwards and downstream from the bearing race and attaches to the engine casing local to the compressor inlet and first guide vane. Thus, the front bearing 356 provides radial support for the fan 350 and fan shaft 312 and reacts the load through the frustoconical wall 322.

In the described embodiment, the front bearing 356 is a roller bearing having an inner race, an outer race, a plurality of roller elements circumferentially distributed around the stub shaft and retained within a cage, as is known in the art. It will be appreciated that although a roller bearing is described in connection with the arrangement shown in FIG. 3, other bearing types may be used. For example, the front bearing may be a thrust bearing as shown in later Figures. The thrust bearing may be a ball bearing or taper bearing as are known in the art.

In order to provide sufficient structural rigidity to the fan shaft and to allow it to react off-centre loading of the fan 352, the fan shaft 318 requires two axially separated bearing locations. The axially separated bearings allow bending moments in the fan shaft 312 to be safely reacted to the engine casing 338. In general, it is preferable from a structural loading point of view to place the bearings at certain minimal axial spacings which are dependent on the architecture of the engine and expected loads. Generally, the closer the bearings are, the larger the radial forces are on the bearings and structural supports. Providing a front bearing support upstream of the gearbox and one downstream of the gearbox generally provides for a suitable axial spacing and preferable structural arrangement. Another option would be to place two bearings upstream of the gearbox, however, to provide sufficient spacing the fan would need to be placed further forward which introduces numerous deleterious effects on the engine structural system.

In order to provide fore and aft bearings, the fan shafting arrangement includes a support shaft which passes through the centre of the gearbox. In the example shown, the support shaft 318 forms part of the fan shaft 312 and lies along the principle axis of the engine. The support shaft 318 passes freely through the sun gear 324 so as to have no direct contact therewith and so can be independently rotated and radially displaced relative to the sun gear and gearbox. Providing the support shaft through the sun gear and in structural isolation from the gearbox allows the radial loading and excursions on the fan shaft 312 to be taken out of the gearbox, vastly simplifying the mechanical requirements of the gearbox.

A first end of the support shaft 318 is located fore of the gearbox and is attached to a downstream end of the fan shaft 312, aft of the radially extending drive arm 316. A second end of the support shaft 318 is located on the downstream side of the gear train and terminates in the aft bearing which in the described example is an intershaft bearing arrangement 360. The intershaft bearing arrangement 360 resides between and allows relative rotation of the low pressure shaft 358 and the support shaft 318 whilst providing radial and axial restraint. The intershaft bearing arrangement includes an inner race, an outer race and a plurality of rolling elements in the form of ball bearings. Hence, the intershaft bearing is a thrust bearing and provides axial restraint of the fan shafting arrangement.

The intershaft bearing end of the support shaft is flared so as to provide a portion of wider diameter in the proximity of the bearing. The internal diameter of the flared portion is sufficient to receive the bearing and the opposing end of the low pressure shaft such that the bearing arrangement 360 is sandwiched therebetween with the support shaft 318 being on the radial outer thereof. Thus, the inner race is attached to the low pressure shaft 358, and the outer race is attached to the support shaft 318. The portion of the low pressure shaft 358 which supports the support shaft 318 terminates with the intershaft bearing.

Hence, the low pressure shaft does not proceed axially within or through the support shaft fore of the intershaft bearing.

The low pressure shaft 358 lies along the principal axis of the engine and provides the driving connection between the low pressure compressor and low pressure turbine. The low pressure shaft 358 is radially and axially supported by appropriate bearings along the length thereof. As can be seen in FIG. 3, one of these bearings is a thrust bearing 362 located towards the fore end of the shaft. The thrust bearing 362 provides radial and axial retention of the low pressure shaft 358 and also provides a stable location for the intershaft bearing 360 which is fore of the low pressure shaft bearing. The main thrust bearing 362 of the low pressure shaft 358 is attached to the engine casing via a suitable support structure. The outer race of the shafting arrangement intershaft 360 bearing is located immediately upstream of the main thrust bearing 362 on a dedicated flange which extends from the low pressure shaft. The low pressure shaft 358 includes a bridge in the form of a flared portion which sits radially outside of and envelops flared end of the support shaft 318 before reducing in diameter as it extends towards the attachment point with the sun gear 324. Thus, the support shaft is concentrically nested within the low pressure shaft downstream of the sun gear 324 and rotatably isolated therefrom.

A catcher shaft 364 is radially nested within the fan shaft 312. The catcher shaft 364 comprises a shaft body which may attach to the fan shaft 312 or support shaft 318 aft of the drive arm attachment point The low pressure shaft 358 is made from two separate sections of shaft which join at the bridge portion, radially outside of the intershaft bearing 360. The joint is provided by a pair of axially opposing radial flanges which are bolted together in an abutting manner. The joint also provides a connection from which a low pressure drive arm extends and attaches to the compressor.

Figure 4:
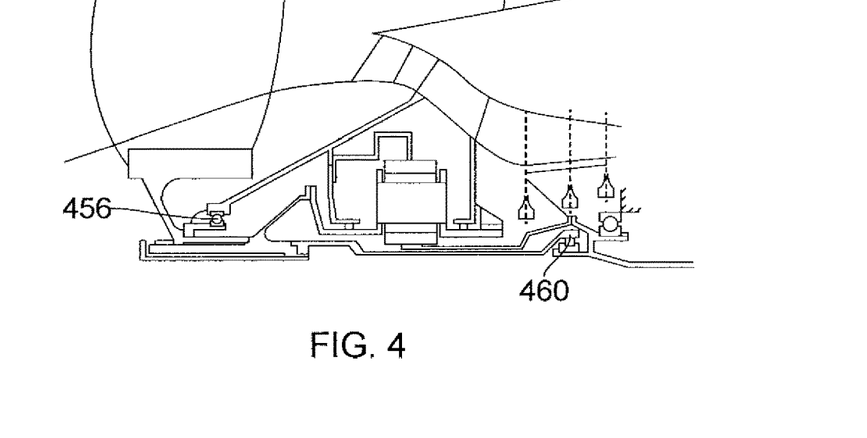
FIG. 4 shows an alternative arrangement of a geared turbo fan shafting arrangement.

The fore and aft bearings between them provide radial, axial and couple retention of the fan and fan shaft. Thus, one of the bearings is a thrust bearing in the form of a ball bearing, and the other a roller bearing. As will be appreciated by the skilled person, the thrust bearing will provide the axial retention, the roller bearing will provide radial positioning only. Although the example shown in FIG. 3 puts the thrust bearing as the aft bearing, and the roller bearing fore bearing, this need not be the case. Thus, FIG. 4 shows the thrust 456 and radial 460 bearings interchanged between the fore and aft position. Hence, the fore bearing is the thrust bearing 456, and the aft bearing is the roller bearing 460. Outside of this difference, the two arrangements of FIGS. 3 and 4 are the same.

Figure 5:
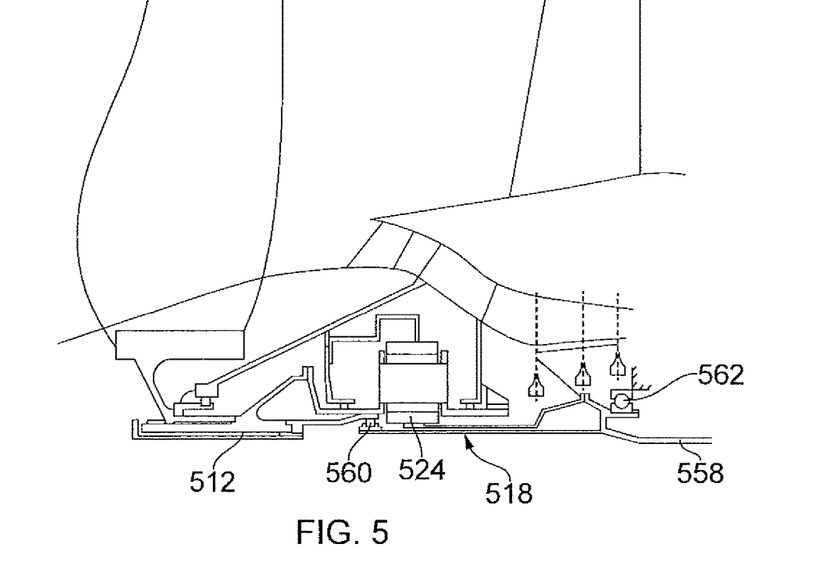
FIG. 5 shows a yet further alternative arrangement of a geared turbo fan shafting arrangement.

FIG. 5 provides an alternative fan shafting arrangement in which the support shaft 518 is provided by the low pressure shaft 558 which passes through the sun gear. Here the intershaft bearing 560 between the low pressure shaft 558 and fan shaft 512 is placed upstream of the gearbox and allows for the differential in rotational speed. The support shaft is still independent from the gearbox and so radial forces/excursions in the fan 512 and support shafts 518 are not transferred to the gearbox. The low pressure shaft 558 includes the main thrust bearing 562 radially inwards of the low pressure compressor, as with the earlier described embodiments, however, the low pressure shaft 558 now includes an extension which passes fore of the main thrust bearing and through the sun gear 524 along the principle axis of the engine.

As with the previous examples, the low pressure shaft 558 still has a dedicated shaft portion for driving the sun gear 524. Hence there is a dual walled or nested low pressure shaft which extends from the main thrust bearing 562 to provide the radial isolation of the fan support shaft and low pressure drive shaft.

Figure 6:
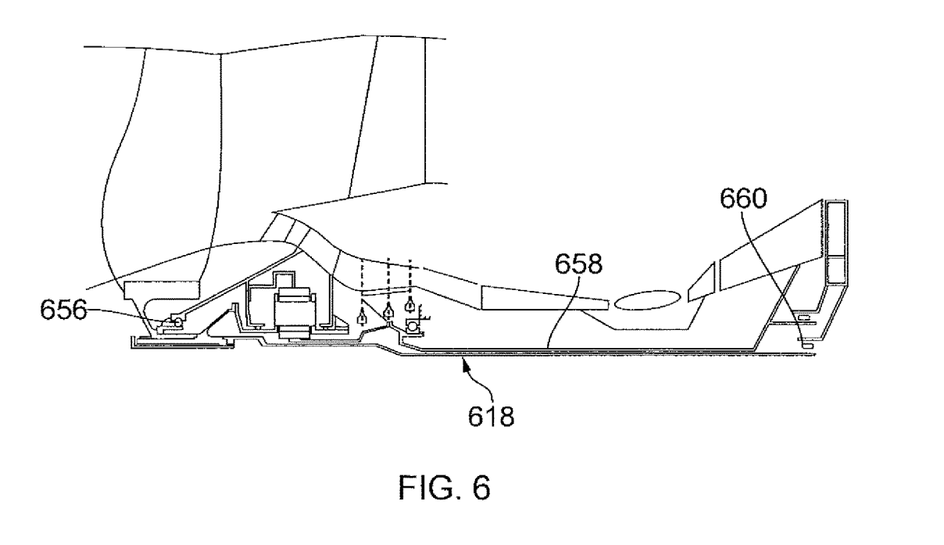
FIG. 6 shows another alternative arrangement of a geared turbo fan shafting arrangement.
Figure 7:
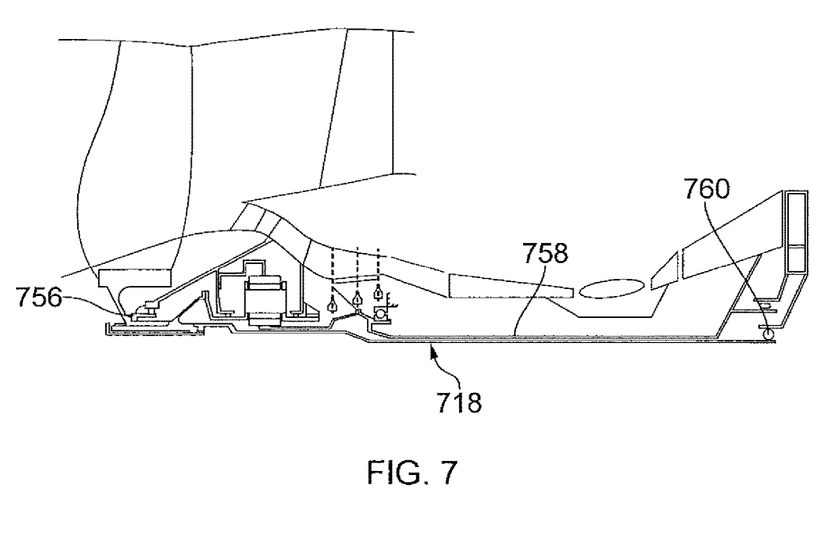
FIG. 7 shows a further alternative arrangement of a geared turbo fan shafting arrangement.

FIGS. 6 and 7 show yet further alternatives to the fan shafting arrangement in which the fan support shaft 618, 718 extends coaxially within the low pressure shaft 658, 758 to the downstream end thereof. Hence, the fan shafting arrangement is mechanically isolated from direct contact with the low pressure shaft 658, 758. The downstream end of the support shaft 618, 718 is supported by a bearing which appends from a support wall which is attached to the engine casing. The attachment may be downstream of the low pressure turbine.

In the example of FIG. 6, the aft support shaft bearing 660 is a roller bearing with the fore bearing being the thrust bearing 656. In the example of FIG. 7, the fore bearing 756 is the roller bearing, with the aft bearing 760 being the thrust bearing.

The above described reduction gears are in the form of epicyclic gearboxes in which the fan is driven via the carrier of a planetary configuration. However, it will be appreciated that the reduction gear could be a star configuration in which the planet gears are fixed, or a compound arrangement. These different configurations are well known in the art.

The described examples above include a low pressure spool having a low pressure turbine, a low pressure shaft and a low pressure compressor. It will be appreciated that the low pressure spool is considered low pressure in relation to the high pressure spool and could be an intermediate pressure spool in some instances. One example of this might be where the fan is taken to be a low pressure compressor in its own right.

It will be understood that the invention is not limited to the described examples and embodiments and various modifications and improvements can be made without departing from the concepts described herein and the scope of the claims. Except where mutually exclusive, any of the features may be employed separately or in combination with any other features and the disclosure extends to and includes all combinations and sub-combinations of one or more described features.

The invention claimed is:

1. A gas turbine engine, comprising:
   a low pressure spool having a low pressure compressor and a low pressure turbine connected by a low pressure shaft;
   a reduction gear train having a sun gear, a carrier having a plurality of planet gears attached thereto, and a ring gear, wherein one of the sun gear, carrier or ring gear is connected to the low pressure shaft, and another of the sun gear, carrier and ring gear provides an output drive;
   a propulsive fan mounted fore of the gear train and at the front of the gas turbine engine;
   a fan shafting arrangement comprising a fan shaft which is connected to the output drive of the gear train and a fan support shaft which passes through the center of the gear train along the axis of rotation of a gearbox and fan, wherein the fan shafting arrangement is rotatably supported by at least two axially separated bearings, and
   wherein the reduction gear train is an epicyclic gear box in which the output drive is the carrier, and the input drive is the sun gear and the fan support shaft passes through the center of the sun gear.

2. A gas turbine engine as claimed in claim 1, wherein the fan support shaft is coaxially nested within the low pressure shaft aft of the gear train.

3. A gas turbine engine in claim 1, wherein the two axially separated bearings include a fore bearing located forward of the gear train and an aft bearing located aft of the gear train.

4. A gas turbine engine as claimed in claim 3, wherein the fan shafting arrangement further includes a drive arm which connects the fan shaft to the carrier and the fore bearing is forward of the drive arm.

5. A gas turbine engine as claimed in claim 4, wherein the drive arm includes a fore drive arm and an aft drive arm which are located respectively forward and aft of the gear train, wherein the fore and aft drive arms connect to respective sides of the carrier.

6. A gas turbine engine as claimed in claim 5, wherein the gearbox is enclosed within a housing having upstream and downstream walls, each of the upstream and downstream walls including bearings which engage with and provide rotational support for the fore and aft drive arms respectively.

7. A gas turbine engine as claimed in claim 3, wherein the aft bearing is an intershaft bearing located between the fan support shaft and low pressure shaft.

8. A gas turbine engine as claimed in claim 3, wherein the aft bearing is a thrust bearing.

9. A gas turbine engine as claimed in claim 3, wherein the front bearing is a roller bearing.

10. A gas turbine engine as claimed in claim 4, wherein the drive arm includes a coupling portion which includes a section of a shaft wall having a divergent-convergent diametric profile in the downstream direction.

11. A gas turbine as claimed in claim 1 wherein the support shaft is formed in part by a portion of the low pressure shaft which passes through the sun gear.

12. A gas turbine as claimed in claim 1, wherein the support shaft extends beyond the low pressure shaft in the downstream direction.

13. A gas turbine as claimed in any of claim 11, wherein the low pressure shaft and fan shaft are separated by an intershaft bearing arrangement which is located upstream of the gearbox.

14. A gas turbine as claimed in claim 1, wherein the low pressure compressor and low pressure turbine are directly connected by the low pressure shaft so as to rotate at the same speed.

15. A gas turbine engine as claimed in claim 1, wherein the low pressure turbine and fan are co-rotational.

16. A gas turbine engine as claimed in claim 7, wherein the low pressure shaft terminates with the intershaft bearing such that the low pressure shaft does not extend axially through the fan support shaft.

* * * * *